United States Patent Office 3,048,770
Patented Aug. 7, 1962

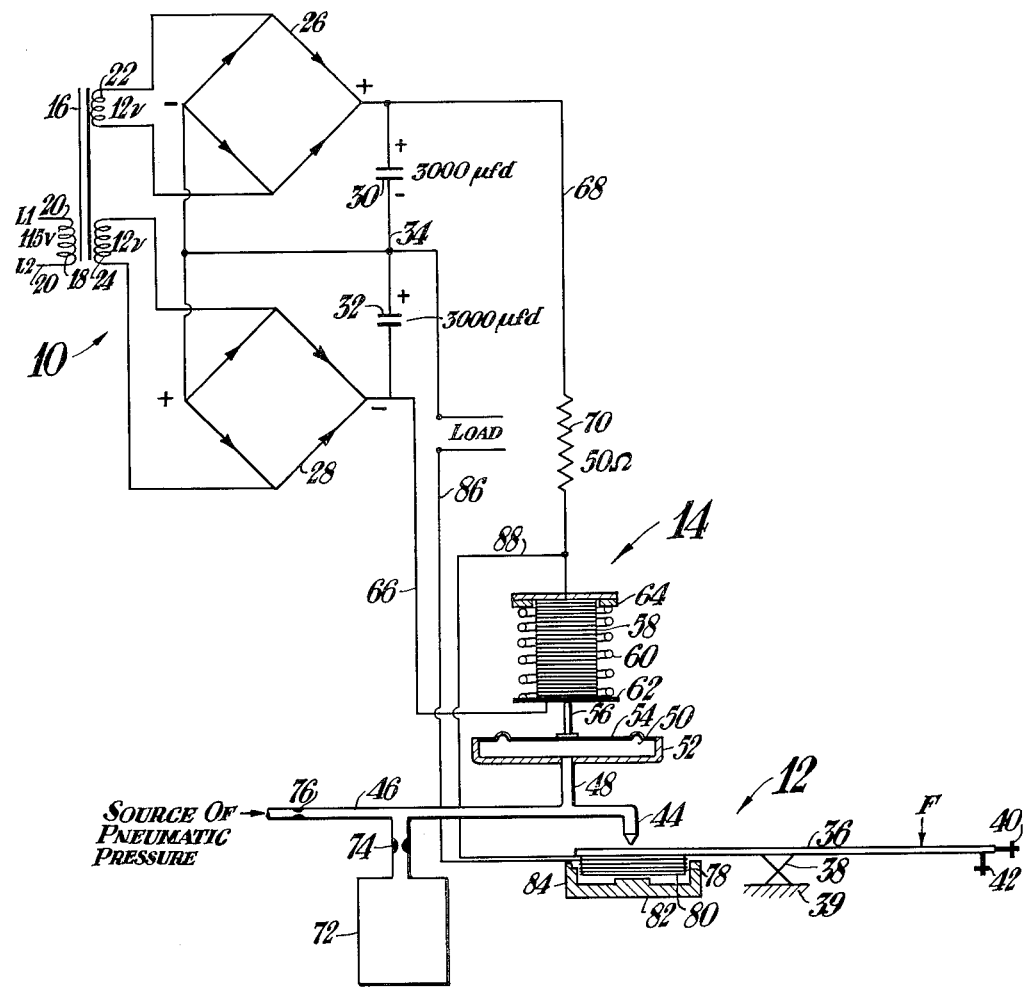
INVENTORS.
DUDLEY D. NYE AND RONALD Y. PARADISE.
BY
Albert J. Henderson
THEIR ATTORNEY.

3,048,770
FORCE TO DIRECT CURRENT TRANSDUCER
Dudley D. Nye, Jenkintown, Pa., and Ronald Y. Paradise, Passaic, N.J., assignors to Robertshaw-Fulton Controls Company, Richmond, Va., a corporation of Delaware
Filed Feb. 20, 1956, Ser. No. 566,457
2 Claims. (Cl. 323—64)

This invention relates to transducers and more particularly to transducers for converting forces which are representative of variables such as mechanical movements, temperatures, fluid flows, and pressures into proportional direct currents.

In an apparatus of this general character, it has been customary to apply a force, indicative of the condition to be measured, recorded and/or controlled, to a deflection beam for purposes of converting the condition into a deflection or displacement of the beam. The deflection in turn is sensed and appropriately applied to an electronic circuit and there transduced into an electric signal which may be proportional to the original force and consequently to the condition to be measured.

There are many inherent disadvantages in these prior art systems and, more noticably, in the use of an electronic circuit for sensing the displacement of a movable member in response to the condition to be measured. These circuits employ numerous electron tubes possessing various characteristics which influence the converted signal in the circuit until the signal is no longer pure and precisely representative of the condition.

This is readily seen from the prior art systems with sensing devices which are quite inadequate for overcoming the drifting characteristics of the tubes. Attempts have been made to offset tube drift, including line voltage drift, by making the sensing devices, which employ galvanometers and the like, more sensitive, however, these attempts have resulted in lessening the ruggedness of the sensing system as well as requiring a corresponding decrease in the sensitivity of the electronic circuit if self-oscillation of the system is to be prevented.

Peculiarities of electric circuits, such as time constants, dead time effects, mass inertia effects in the deflection device and the use of A.C. plate voltages, seriously limit the possible loop gain of the system. In these cases, the sensitivity of the electronic circuit must be reduced to avoid self-oscillation, resulting in the same loop gain as was present in the system before making the sensing device more sensitive. Heretofore, there has been no effective arrangement which will permit the utilization of an extremely sensitive pick-up device without affecting the sensitivity of the other portions of the system, and which will permit an increase in the loop gain as well.

Another inherent disadvantage of the electronic systems is the relatively large plate voltages which are required to supply the circuit. These voltages render the system intrinsically unsafe and the circuits themselves must be placed in atmospheres which are clearly safe thus reducing the field of use to which the apparatus may be otherwise applied.

The present invention utilizes a deflection beam to which the variable to be measured is applied in the form of a force to cause deflection or movement of one end of the beam. A stationary nozzle is positioned adjacent to the other end of the beam so as to vary the pressure in a pneumatic circuit in accordance with the deflection of the beam. The change in pressure of the pneumatic circuit is adapted to proportionately vary the resistance of a carbon pile. The carbon pile is connected in a circuit for energizing a balancing coil placed in a magnetic field and secured at the end of the beam adjacent to the nozzle to be movable with that end of the beam.

Energization of the balancing coil in accordance with the resistance change in the carbon pile will exert a force upon that end of the beam for balancing the initial force of the condition to be measured, thus completing the servo loop of the system. Suitable compensating means in the form of pneumatic restrictors and a damping tank are employed in the pneumatic portion of the loop to provide loop stability when using the extremely sensitive pick-up characteristics of the nozzle-beam arrangement. Thus, provision is made for utilizing the high loop gain of the system without generating self-oscillation in the apparatus.

It is, therefore, a principal object of the present invention to utilize an extremely sensitive pick-up device of the flapper-nozzle type in combination with an electrical balancing circuit to permit the maximum loop gain of the system.

Another object of the invention is to insure complete stability of a force-to-current transducer against supply pressure and line voltage variations.

Another object of the invention is to eliminate the use of vacuum tubes in a force-to-current transducer thereby reducing maintenance costs and down time.

Another object of the invention is to eliminate drift characteristics, high voltages and the like from the force to electric current transducer thereby rendering the transducer intrinsically safe and of extreme reliability.

Other objects and advantages will appear from the following specification taken in connection with the accompanying drawing which is a schematic view of the improved transducer and control circuit therefor.

Referring more particularly to the drawing, the transducer comprises a rectifier circuit, generally indicated by the reference numeral 10, a flapper-nozzle pneumatic sensing device generally indicated by the reference numeral 12 and a carbon pile electric balancing circuit generally indicated by the reference numeral 14.

The rectifier circuit 10 is provided with a stepdown transformer 16 having a primary winding 18 connected by a pair of lead lines 20 to a source of alternating line voltage L1, L2. A pair of secondary windings 22, 24, with an output of approximately 12 volts is each inductively wound around the primary winding 18 and serves to supply a pair of metallic rectifier bridges 26, 28 respectively with alternating current. A pair of filtering condensers 30, 32 are connected by a conductor 34 to the positive and negative terminals of the bridges 26, 28, respectively.

The flapper-nozzle sensing device 12 of the present invention includes a baffle lever or arm 36 which is adapted to receive a force F adjacent to one end thereof, representative of the condition to be measured, controlled and/or recorded. This force F may be exerted by a spring, bellows, Bourdon tube or diaphragm, the expansion or contraction of which is indicative of a pressure differential, pressure change, temperature and the like. The lever 36 is pivoted centrally thereof on a cross-flexure 38 mounted on a support 39, and is provided with a pair of longitudinally and transversely extending adjustable counterweights 40, 42 respectively at the force receiving end thereof. It will be apparent that as viewed in the drawing the longitudinal counterweight 40 stabilizes the lever 36 against vertical vibration or movement of the lever support 39 and the transverse counterweight 42 stabilizes against horizontal vibration of the support.

The other end of the lever 36 is located in flow controlling association with a nozzle 44 as determined by the force F exerted on the remote end of the lever 36. The nozzle 44 has a conduit 46 leading thereto for supplying a pneumatic flow to the nozzle 44 from any suitable source. It will be apparent that as the lever 36 is rotated in a clockwise direction, the same will approach the tip of the nozzle 44 to restrict the flow therethrough and, consequently, increase the fluid pressure within the conduit 46. Conversely, a counterclockwise rotation of the lever 36 will increase the gap between the tip of the nozzle 44 and the lever 36 to decrease the fluid pressure in the conduit 46.

The conduit 46 is connected by a pipe 48, adjacent to the nozzle 44, for communication with an expansible chamber 50 defined by a cup-shaped support 52 and a diaphragm 54 secured across the open end thereof, the diaphragm 54 defining a movable end wall of the chamber 50. Centrally connected above the diaphragm 54 is a transmission rod 56 which serves to transmit the force exerted by pressure in the chamber 50 upon the diaphragm 54 to a carbon pile 58 for compressing the same in accordance with the pressure in the chamber 50. Opposing this force on the carbon pile 58 is an adjustable coil spring 60 held in compression between a suitable flange 62 mounted on one end of the carbon pile 58 and one surface of a support 64 for the pile 58. The spring 60 provides a means for preventing compression of the carbon pile 58 by the initial operating pressure in the chamber 50. Adjustment of the spring 60 determines the nozzle pressure required to completely compress the carbon pile 58.

The carbon pile 58 is connected in a series circuit to the output terminals of the rectifier circuit 10 by a pair of conductors 66, 68. A resistor 70 is in series with the carbon pile 58, between the same and the positive terminal of the rectifier bridge 26 and is utilized to determine the resistance operating range of the carbon pile 58. To complete the pneumatic system, a capacity tank 72, is connected to the conduit 46 between the source and the nozzle 44. A restriction 74 is positioned between the conduit 46 and the interior of the tank 72, and a second restriction 76 is positioned upstream of the tank 72 for a purpose to be described hereinafter.

A feedback circuit is arranged to electrically balance the beam 36 and takes the form of a coil 78 wound around a hollow cylindrical conducting form 80 secured to the end of the lever 36 adjacent to the nozzle 44. The coil 78 and the form 80 are adapted to be received in the interior of a magnet assembly 82, having core pieces 84, for traversing the magnetic flux lines between the core pieces 84 thereby causing movement of the form 80 when a change of current is induced in the coil 78. The coil 78, and the magnet assembly 82 are arranged so that upon a decrease in the current flow through the coil 78, the same will become an electromagnet having a polarity opposite to that of the magnet assembly 82 so as to produce a force of repulsion, the intensity of which is proportional to the current in the coil 78. In this event, the decrease in current in the coil 78 will cause upward movement of the same and conversely an increase in current will produce a force of attraction to force the coil 78 in a downward direction. The coil 78 is connected to the rectifier circuit 10 between the filter capacitors 30, 32 by a conductor 86 and to the carbon pile circuit 14 between the resistor 70 and the carbon pile 58 by a conductor 88. The conductor 86 may be broken at any point to be connected to a measuring device, recorder and/or controller.

*Operation*

Assuming that the lever 36 is in a balanced condition, the rectifier bridge circuit 10 will furnish a constant current output in the conductors 66, 68. The source of pneumatic pressure will furnish a steady flow of fluid to the nozzle 44 so that the apparatus is in condition for a force to be applied to the lever 36. The force F may be supplied by any suitable device which will cause a deflection of the beam 36 in response to any variable to be measured or controlled. Assuming that a change in the force F or an initial force is applied in a downward direction, as viewed in the drawing, the lever 36 will rotate in a clockwise direction to decrease the gap between the lever 36 and the nozzle 44 and thus increase the pneumatic pressure in the conduit 46 as previously explained.

This increased pneumatic pressure in the conduit 46 is conducted by the conduit 48 to the chamber 50 where it is applied to the diaphragm 54. Since the pneumatic pressure in the chamber 50 is increased, the diaphragm 54 will move outwardly and cause the rod 56 carried thereby to impart a compression force upon the carbon pile 58. This compression force on the pile 58 will decrease the effective resistance thereof which causes an increased current in the output conductors 66, 68 of the rectifier bridge circuit 10. This increase in the output current is sensed at the coil 78 by way of the conductors 86, 88 and will cause downward movement of the form 80 for exerting a torque upon the lever 36 in opposition to the force F applied thereto. Upon this occurrence, the lever 36 will move away from the nozzle 44 to increase the gap therebetween until the current in the coil 78 reaches a value wherein the torque developed by the coil 78 is equal to the torque induced by the force F. A load or current receiver (not shown) connected in series with the conductor 86 will experience this change in current as being directly proportional to the force F.

If the force F is decreased or removed, the lever 36 will rotate in a counterclockwise direction. This movement is caused by the torque exerted on the lever 36 by the coil 78 and the gap between the nozzle 44 and the lever 36 will increase. The pressure in the conduit 46 and the chamber 50 is consequently decreased. The rod 56 will then move downwardly to release the force on the carbon pile 58 with a resulting increase in the resistance therethrough. This increase in resistance causes a decrease in the current in the coil 78 thus permitting the same to move upwardly to reduce the gap between the nozzle 44 until the current in the coil reaches a value directly proportional to the newly applied force F.

It will be apparent that any line voltage variation in the lines L1, L2 will cause a corresponding variation in the current flow in the conductors 86, 88 and the coil 78. However, this variation will be compensated for by the repositioning of the form 80 and the lever 36 with respect to the nozzle 44 for adjusting the gap between the same and the lever 36. Adjustment of the gap will proportionately adjust the resistance in the output circuit of the rectifying circuit for increasing or decreasing the current therethrough as the case may be and restore the original output current before the line variation.

In similar fashion, any variation in pressure at the source will vary the pressure in the chamber 50 for adjusting the resistance in carbon pile 58. Variation of the current in the rectifier output circuit will be immediately felt at the coil 78 resulting in the repositioning of the lever 36 and the readjustment of the gap between the same and the nozzle 44. This movement of the lever 36, in effect, will restore the original pressure in the conduit 46 without affecting the current in the output circuit.

The present invention is also stabilized against sudden pressure variations from the source by the compensating tank 72 and the restrictions 74, 76. Any sudden buildup of pressure in the conduit 46 will cause leakage of the fluid through the resistor 74 into the tank 72 thus bleeding out a portion of fluid in the system and allowing a steady and relatively slow increase of the pressure buildup. Similarly, any sudden decrease in pressure will permit the slow escape of the fluid from the tank 72 into the conduit 46 to slow down the decrease of the pressure.

The compensating tank 72 also serves the purpose of allowing the electrical circuit and the sensing device, comprising the lever 36 and the nozzle 44, to be made highly sensitive without affecting the stability of the system. By proper dimensioning of the nozzle 44 and the gap between the same and the lever 36, the sensing ability of these elements can be greatly increased and any tendency for self-oscillation of the apparatus will be suppressed by the action of the restrictions 74, 76 and the tank 72.

It is claimed and desired to secure by Letters Patent:

1. An electropneumatic apparatus for providing an electrical quantity proportional to the magnitude of a variable force including a fluid pressure supply and a source of electrical power, the combination comprising a nozzle, a conduit connecting said nozzle with the fluid pressure supply, means defining a contractible and expansible chamber having a movable end wall, means connecting said chamber to said conduit at a point intermediate the fluid pressure supply and said nozzle, a pivoted lever movable in response to the variable force having one end portion positioned adjacent said nozzle so that movement of said lever controls the flow from said nozzle to cause a pressure variation within said chamber which is effective to cause movement of said movable end wall, means connected to said conduit intermediate said chamber and the fluid pressure supply for reducing the rate of change of pressure in said conduit, an impedance element variable in response to pressure, means operatively connecting said end wall to said element to exert pressure on said element in accordance with movement of said end wall, an electrical circuit connected to the source of electrical power having an output which varies with said variation of said impedance element, and electromagnetic means connected to said output and in operative association with said lever to exert a force thereon in proportion to said output to balance the force exerted on said lever by the variable force.

2. An electropneumatic apparatus for providing an electrical quantity proportional to the magnitude of a variable force including a fluid pressure supply and a source of electrical power, the combination comprising a nozzle, a conduit connecting said nozzle to the fluid pressure supply, means defining a contractible and expansible chamber having an end wall movable in response to pressure variations within said chamber, means connecting said chamber to said conduit intermediate said nozzle and the fluid pressure supply, a pivoted lever movable in response to the variable force having one end portion positioned adjacent said nozzle so that movement of said lever controls the flow from said nozzle to cause a pressure variation within said chamber which is effective to move said movable end wall, a capacity tank having a restriction, means connecting said tank to said conduit intermediate said chamber and the fluid pressure supply, an impedance variable in response to pressure, means operatively connecting said end wall to said element to exert pressure on said element in accordance with movement of said end wall, an electrical circuit including said impedance element having an output which varies with the impedance of said element, and electromagnetic means connected to said output and in operative association with said lever to exert a force thereon in proportion to said output to balance the force exerted by the variable force.

References Cited in the file of this patent

UNITED STATES PATENTS

| | | |
|---|---|---|
| 1,184,460 | Koffitz | May 23, 1916 |
| 2,601,867 | Alyea | July 1, 1952 |
| 2,662,540 | Rutherford et al. | Dec. 15, 1953 |
| 2,683,245 | Wunsch | July 6, 1954 |
| 2,842,147 | Markson | July 8, 1958 |
| 2,874,713 | Ochs et al. | Feb. 24, 1959 |

FOREIGN PATENTS

| | | |
|---|---|---|
| 636,621 | Great Britain | May 3, 1950 |